US010333774B2

(12) United States Patent
Ito

(10) Patent No.: US 10,333,774 B2
(45) Date of Patent: Jun. 25, 2019

(54) IMAGE FORMING APPARATUS THAT COOPERATES WITH MANAGEMENT SERVER, METHOD OF CONTROLLING IMAGE FORMING APPARATUS, AND STORAGE MEDIUM

(71) Applicant: CANON KABUSHIKI KAISHA, Tokyo (JP)

(72) Inventor: Yuki Ito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/783,972

(22) Filed: Oct. 13, 2017

(65) Prior Publication Data
US 2018/0109413 A1    Apr. 19, 2018

(30) Foreign Application Priority Data
Oct. 18, 2016    (JP) .................................. 2016-204379

(51) Int. Cl.
*H04L 12/24*    (2006.01)
*H04L 12/58*    (2006.01)
*H04L 29/08*    (2006.01)

(52) U.S. Cl.
CPC ........ *H04L 41/069* (2013.01); *H04L 41/0266* (2013.01); *H04L 41/0883* (2013.01); *H04L 51/063* (2013.01); *H04L 51/24* (2013.01); *H04L 67/26* (2013.01); *H04N 2201/0017* (2013.01)

(58) Field of Classification Search
CPC .... G06F 3/1288; G06F 3/1292; G06F 3/1238; G06F 3/1204; G06F 3/1287; G06F 3/1279; H04L 67/02
See application file for complete search history.

(56) References Cited

U.S. PATENT DOCUMENTS

| | | | |
|---|---|---|---|
| 2010/0250787 A1* | 9/2010 | Miyata | G06F 3/1203 710/9 |
| 2013/0010324 A1* | 1/2013 | Towata | G06F 3/122 358/1.15 |
| 2013/0258384 A1* | 10/2013 | Kanoh | G06F 3/1297 358/1.13 |
| 2014/0055814 A1* | 2/2014 | Eguchi | H04N 1/00405 358/1.15 |

FOREIGN PATENT DOCUMENTS

JP    2006268650 A    10/2006

* cited by examiner

*Primary Examiner* — Frantz Bataille
(74) *Attorney, Agent, or Firm* — Canon U.S.A., Inc. IP Division

(57) ABSTRACT

Provided is a method of controlling an image forming apparatus, the method including: periodically making an inquiry about an instruction to a management server; determining whether or not to display a notification indicating that a message has arrived, based on information about a registered time of the message acquired by the management server as a result of the inquiry, and information about a time when the message is displayed on the image forming apparatus; and controlling the notification indicating that a message has arrived to be displayed in a predetermined display area in accordance with at least a determination, in the determining, that the notification indicating that the message has arrived is displayed, and controlling not to display the notification indicating that the message has arrived in accordance with at least a determination, in the determining, that the notification indicating that the message has arrived is not displayed.

7 Claims, 16 Drawing Sheets

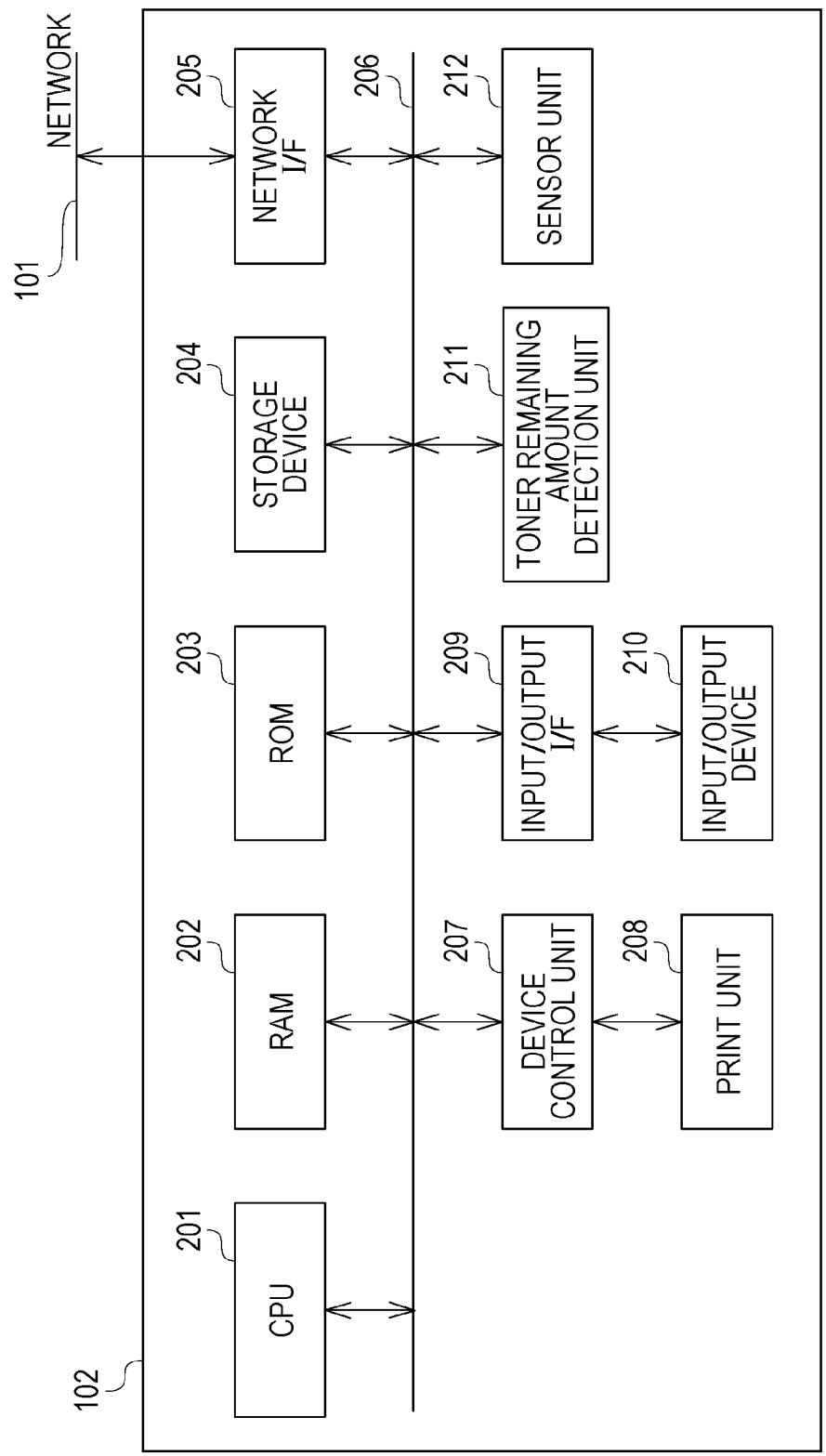

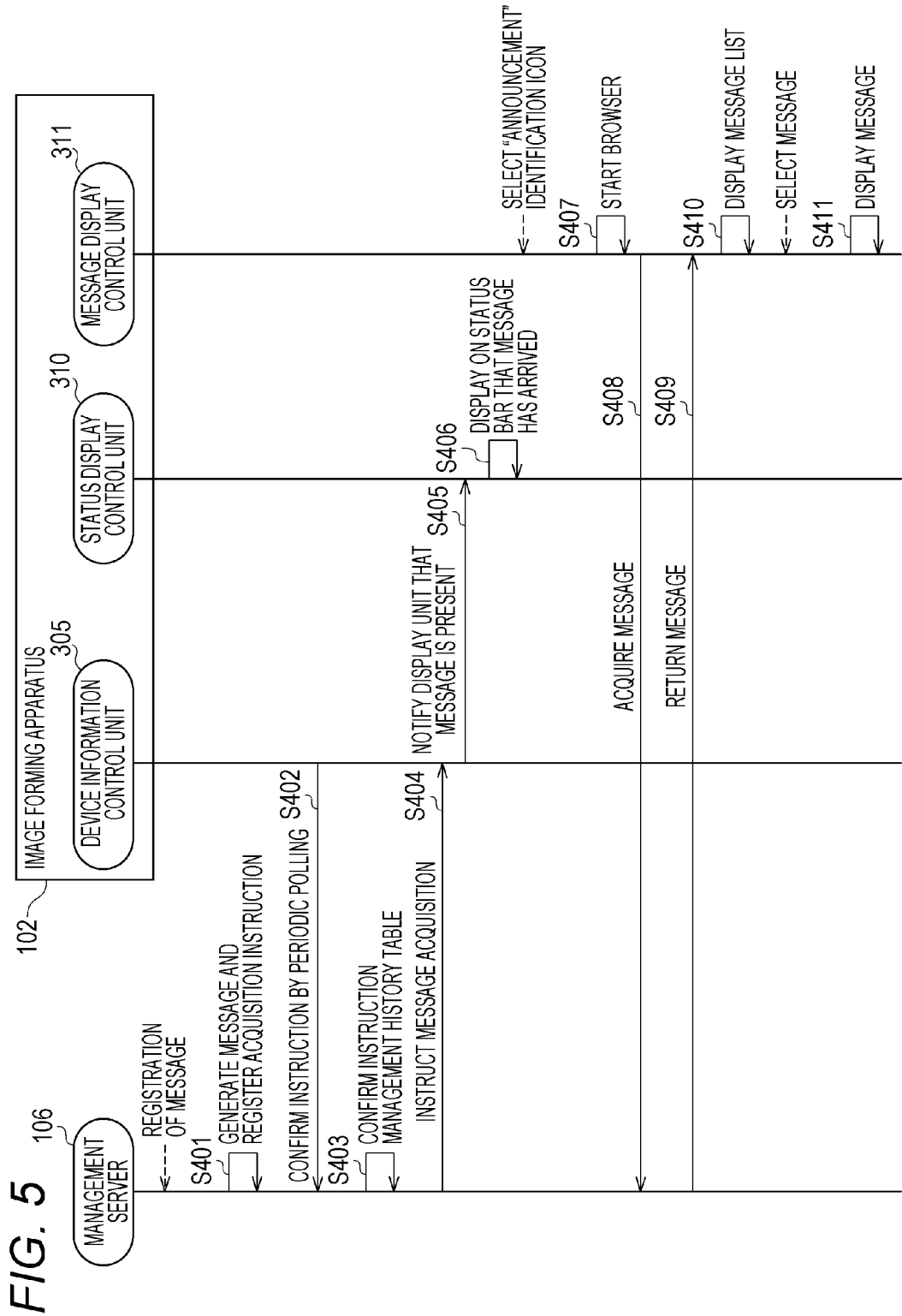

*FIG. 6A*

```
<env:Envelope
xmlns:env="http://schemas.xmlsoap.org/soap/envelope/"
eriv:encodigStyle="http://shemas.xmlsoap.org/soap/encoding/">
  <env:Body>
    <ns:getInstruction xmlns:ns="rdsgw">
      <client>
        <id>100</id>
        <type>type A</type>
        <appVersion>1.00</appVersion>
      </client>
        <device>
          <mac>85:33:f2:2a</mac>
          <ip>192.168.0.1</ip>
          <serialNumber>serial:99345567</serialNumber>
          <productName>real new device..</productName>
          <type>type A</type>
        </device>
    </ns:getInstruction>
  </env:Body>
</env:Envelope>
```

```
<SOAP-ENV:Envelope xmlns:SOAP-
ENV="http://schemas.xmlsoap.org/soap/envelope/"
xmlns:xsi="http://www.w3.org/2001/XMLSchema-instance"
xmlns:xsd="http://www.w3.org/2001/XMLSchema">
  <SOAP-ENV:Body>
    <ns:getInstructionResponse xmlns:ns1="rdsgw" SOAP-
ENV:encodingStyle="http://schemas.xmlsoap.org/soap/encoding/">
      <notice>
        <key>NewMsg</key>
        <value>2016-02-10T18:24:12.000Z</value>
      </notice>
    </ns:getInstructionResponse>
  </SOAP-ENV:Body>
</SOAP-ENV:Envelope>
```

```
<SOAP-ENV:Envelope xmlns:SOAP-
ENV="http://schemas.xmlsoap.org/soap/envelope/"
xmlns:xsi="http://www.w3.org/2001/XMLSchema-instance"
xmlns:xsd="http://www.w3.org/2001/XMLSchema">
  <SOAP-ENV:Body>
    <ns:getInstructionResponse xmlns:ns1="rdsgw" SOAP-
ENV:encodingStyle="http://schemas.xmlsoap.org/soap/encoding/">
      <download>
        <URL>https://server.net/001</URL>
        <userID>aaa</userID>
        <password>bbb</password>
      </download>
    </ns:getInstructionResponse>
  </SOAP-ENV:Body>
</SOAP-ENV:Envelope>
```

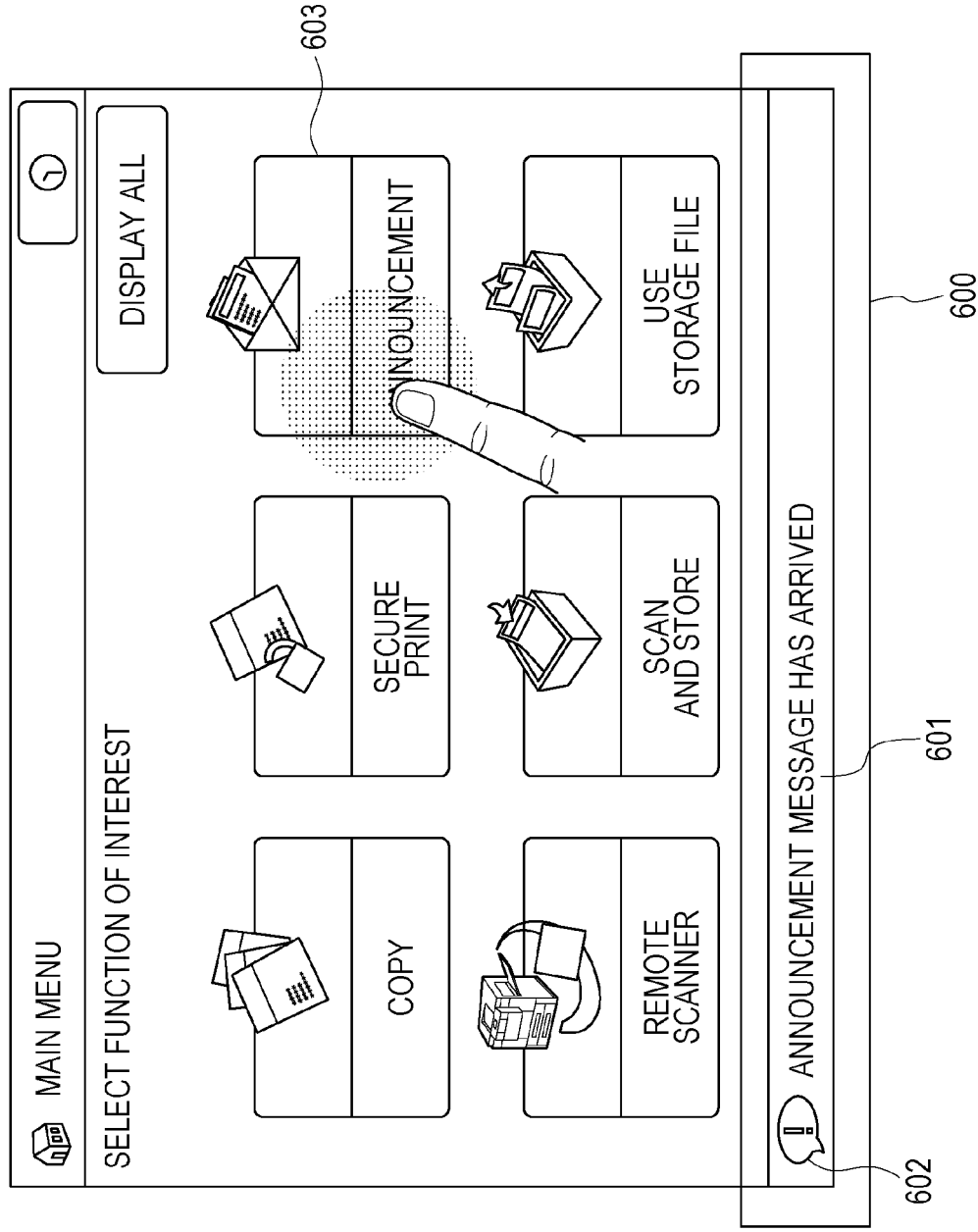

FIG. 9

| ✓ | SUBJECT | REGISTERED DATE AND TIME |
|---|---|---|
| ☐ | ✉ ANNOUNCEMENT OF TONER DELIVERY | 2015/04/16 14:20 |
| ☑ | ✉ ANNOUNCEMENT OF RECOVERY TONER BOX DELIVERY | 2015/01/09 12:31 |
| ☑ | ✉ ANNOUNCEMENT OF TONER DELIVERY | 2014/12/24 11:51 |
| ☐ | ✉ ANNOUNCEMENT OF FIRMWARE UPDATE | 2014/05/30 11:51 |
| ☐ | ✉ ANNOUNCEMENT OF REGULAR CHECK | 2014/04/06 10:13 |

<MESSAGE LIST>

801

1/3

⟳ ACQUIRE LATEST MESSAGE   DELETE   ◀ RETURN

802

IMAGE FORMING APPARATUS THAT COOPERATES WITH MANAGEMENT SERVER, METHOD OF CONTROLLING IMAGE FORMING APPARATUS, AND STORAGE MEDIUM

BACKGROUND

Field of the Disclosure

The present disclosure relates to an image forming apparatus that cooperates with a management server, a method of controlling the image forming apparatus, and a storage medium.

Description of the Related Art

Heretofore, a system in which a management server sends a notification to a dispatcher, a service person, a person in charge of consumables, or the like of a vendor according to event information (error, alarm, or jam) notification of which is given from an image forming apparatus has been proposed.

The image forming apparatus of related art sends the information as mentioned above to the management server, and displays the notification from the management server on a panel, thereby prompting a user to deal with the image processing apparatus. For example, when a small toner remaining amount is displayed, the user requests a call center to check a delivery state, or deliver a toner.

The panel of the image forming apparatus is provided with a display area for displaying the state of the image forming apparatus. For example, there is a display area called a status bar. The status bar is constantly displayed even when the screen is shifted. The status bar displays, for example, an error indicating that the toner remaining amount or the amount of remaining paper in a cassette is small. Further, the image processing apparatus is capable of causing the status bar to display the presence or absence of a notification from the management server.

Japanese Patent Laid-Open No. 2006-268650 discloses a system for managing consumable for the image forming apparatus. The image forming apparatus disclosed in Japanese Patent Laid-Open No. 2006-268650 detects that it is about time to exchange consumables, displays the detection result on a screen. Then, when a client sends an order instruction on the screen, the image forming apparatus sends order data to the management server, receives delivery time data from the management server, and displays the data on the screen. Accordingly, there is a need for a technique for facilitating ordering of consumables and confirmation of a delivery time in an image processing apparatus.

SUMMARY

An exemplary aspect of the present disclosure is an image forming apparatus that communicates with a management server, the image forming apparatus including: an operation unit, and at least one hardware processor, when the at least one hardware processor executes instructions, which acts as, an inquiry unit configured to periodically make an inquiry about an instruction to the management server, a determination unit configured to determine whether or not to display a notification indicating that a message has arrived, based on information about a registered time of the message acquired by the management server as a result of the inquiry, and information about a time when the message is displayed on the image forming apparatus, the information being stored in the image forming apparatus, and a display control unit configured to control the notification indicating that a message has arrived to be displayed in a predetermined display area on the operation unit in accordance with at least a determination, by the determination unit, that the notification indicating that the message has arrived is displayed, and control not to display the notification indicating that the message has arrived in the predetermined display area on the operation unit in accordance with at least a determination, by the determination unit, that the notification indicating that the message has arrived is not displayed.

Further features of the present disclosure will become apparent from the following description of exemplary embodiments (with reference to the attached drawings).

BRIEF DESCRIPTION OF THE DRAWINGS

FIGS. 2A and 2B illustrate an example of a hardware configuration diagram illustrating the image forming apparatus and the management server according to one or more aspects of the present disclosure.

FIG. 5 is an example of a sequence diagram illustrating information processing of each of the management server and the image forming apparatus according to one or more aspects of the present disclosure.

FIG. 6A is a diagram (No. 1) illustrating an example of SOAP data to be transmitted and received by the image forming apparatus according to one or more aspects of the present disclosure.

FIG. 6B is a diagram (No. 2) illustrating an example of SOAP data to be transmitted and received by the image forming apparatus according to one or more aspects of the present disclosure.

FIG. 6C is a diagram (No. 3) illustrating an example of SOAP data to be transmitted and received by the image forming apparatus according to one or more aspects of the present disclosure.

FIG. 7 is a diagram illustrating an example of a screen for a status bar display that is displayed on the image forming apparatus according to one or more aspects of the present disclosure.

FIG. 9 is a diagram illustrating an example of a screen when a message from the image forming apparatus is deleted according to one or more aspects of the present disclosure.

DESCRIPTION OF THE EMBODIMENTS

In this exemplary embodiment, a mechanism for displaying, on a status bar, that a notification has arrived when the notification from the management server is not checked by a user so that the presence or absence of the notification from the management server can be appropriately displayed on the status bar. Exemplary embodiments of the present disclosure will be described below with reference to the drawings.

Figure 1:
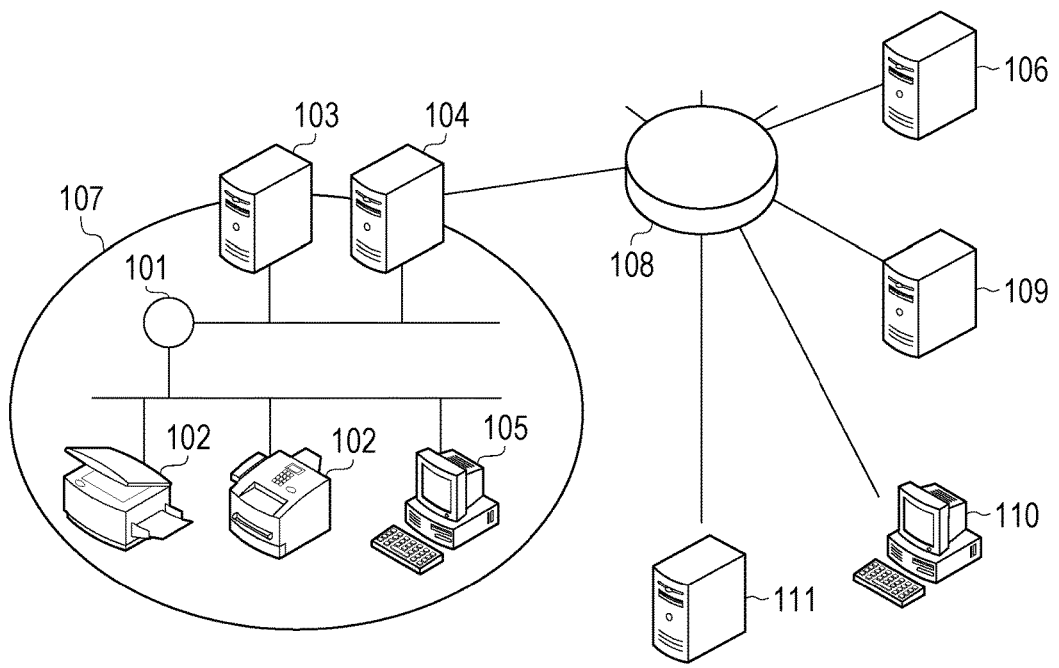
FIG. 1 is an example of a block diagram of a system including an image forming apparatus and a management server according to one or more aspects of the present disclosure.

FIG. 1 is a diagram illustrating an example of a system configuration of a system including an image forming apparatus and a management server.

An image forming apparatus 102, a proxy server 103, a firewall 104, and a personal computer (PC) 105 are connected to each other via a LAN 101 in such a manner that they can communicate with each other. The firewall 104 is installed to enhance the security of the Internet. The PC 105 is a computer used for a general user to perform work and the like, and may be, for example, a tablet terminal or a smartphone. The Internet environment 107 represents the Internet environment in which the image forming apparatus 102, the proxy server 103, and the firewall 104 are connected to each other via the LAN 101. A management server (also referred to as a maintenance system server) 106 has a function of managing the operation state in a centralized manner based on the counter and operation information about the image forming apparatus 102, and a function of performing a stock management of consumables based on consumable status information about the image forming apparatus 102. The information about the image forming apparatus 102 is hereinafter referred to as device information. Note that the Internet environment 107 and the management server 106 are connected to each other via the Internet 108. The image forming apparatus 102 transmits the device information about the image forming apparatus 102 to the management server 106 which is set as a transmission destination of the device information such as the operation information about the image forming apparatus 102. Note that in the example of FIG. 1, only one Internet environment 107 is described, but in practice, a plurality of Internet environments 107 and the management server 106 are connected to each other via the Internet 108. For example, a digital multifunction machine, a facsimile, a printer, a scanner device, and an MFP (Multifunction Peripheral) can be applied as the image forming apparatus 102. A digital medical device, a network camera, a car navigation system, and various network home electronics may be applied as the image forming apparatus 102. A firmware management server 109 remotely delivers firmware for updating the firmware of the image forming apparatus 102. A vendor user PC 110 and a delivery system 111 of a delivery company, which are an external system, are connected to the Internet 108. The vendor user PC 110 is a PC to be used by a user of a vendor. The vendor user PC 110 may be a tablet terminal, a smartphone, or the like. The delivery system 111 manages a consumable delivery status.

Further, in this exemplary embodiment, protocols such as HTTP and HTTPS are assumed as communication protocols, but the communication protocols are not particularly limited. For example, the example of FIG. 1 is described assuming that the image forming apparatus 102 uses HTTPS to transmit data to the management server 106 via the proxy server 103 and the firewall 104. However, the present disclosure is not limited to this example.

FIG. 2A is a diagram illustrating an example of a hardware configuration of the image forming apparatus 102.

The image forming apparatus 102 includes a CPU (Central Processing Unit) 201, a RAM (Random Access Memory) 202, a ROM (Read Only Memory) 203, a storage device 204, a network I/F 205, an internal bus 206, a device control unit 207, a print unit 208, an input/output I/F 209, an input/output device 210, a toner remaining amount detection unit 211, and a sensor unit 212. The CPU 201 performs overall control of each device via the internal bus 206. The internal bus 206 is connected to the CPU 201, the RAM 202, the ROM 203, the storage device 204, the network I/F 205, the device control unit 207, the input/output I/F 209, the toner remaining amount detection unit 211, the sensor unit 212, and the like. The ROM 203 stores programs (including a program for implementing a software configuration of FIG. 3A described below). The RAM 202 functions as a memory or a work area for the CPU 201. The CPU 201 performs processing of executing programs with the RAM 202 and the ROM 203, and performs processing of recording image data in a recording medium such as the storage device 204. The ROM 203 stores destination information indicating an area to which the image forming apparatus 102 is shipped, and the like, in addition to programs. A language and the like to be displayed by the input/output device 210 are determined according to the destination information. The storage device 204 functions as an external storage device, stores image data and the like, and can also store counter information, system information, and monitoring information, instead of the RAM 202. The network I/F 205 performs unidirectional or bidirectional data exchange with an external network device or a PC via the LAN 101. The device control unit 207 controls the print unit 208, and forms an image on a sheet such as paper. The print unit 208 is, for example, an electrophotographic print unit, and includes an exposure unit, a transfer unit, and a fixing unit. Note that an inkjet method and the like can be employed as the image forming method of the print unit 208. The input/output device 210 indicates a plurality of components that input and output signals in the image forming apparatus 102. More specifically, the input/output device 210 accepts an input (button input etc.) from a user, and the input/output I/F 209 transmits the signal corresponding to the input to each processing unit described above. In addition, the input/output device 210 provides the user with necessary information, and includes a display device (a touch panel etc.) for accepting a user operation. Further, a scan device for reading a document and accepting electronic data as an input may be included in the input/output device 210. The toner remaining amount detection unit 211 detects the toner remaining amount of the print unit 208 using a sensor, and generates a signal for an alert, alarm, or the like. The sensor unit 212 detects an attachment/detachment or the like of a toner bottle, and can read the serial number of the set toner bottle. Although a toner is illustrated as an example of consumables for the image forming apparatus 102, other consumables may be used.

The CPU 201 executes processing based on the program stored in the ROM 203 or the storage device 204, thereby implementing the software configuration of the image forming apparatus 102 illustrated in FIG. 3A described below, processing of the image forming apparatus 102 illustrated in FIG. 5, and processing of flowcharts illustrated in FIGS. 11 to 13. FIG. 2A illustrates an example in which one CPU is provided as the hardware configuration of the image forming apparatus 102. However, a plurality of CPUs may be provided. The software configuration of the image forming apparatus 102 illustrated in FIG. 3A, the processing of the image forming apparatus 102 illustrated in FIG. 5, and the processing of flowcharts illustrated in FIGS. 11 to 13 as described below may be implemented by causing a plurality of processors and a plurality of RAMs, ROMs, and storages to cooperate with each other. Further, a part of the processing in the flowcharts or the like may be executed using a hardware circuit.

Figure 2B:
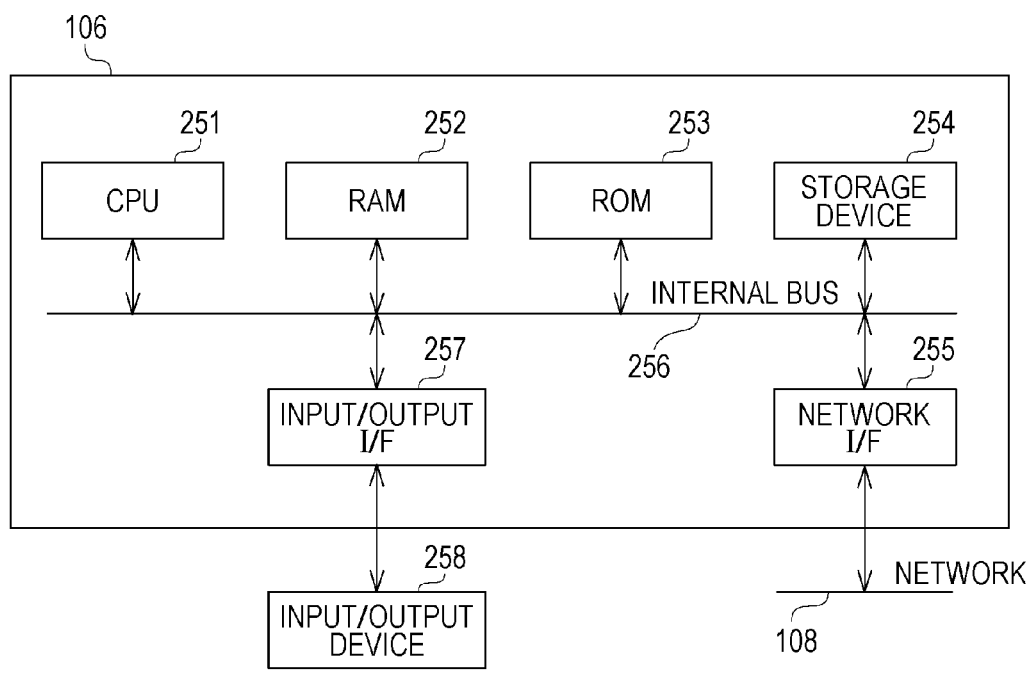

FIG. 2B is a diagram illustrating an example of a hardware configuration of the management server 106.

A CPU 251 performs overall control of each device via an internal bus 256. The internal bus 256 is connected to the CPU 251, a RAM 252, a ROM 253, a storage device 254, a network I/F 255, an input/output I/F 257, and the like. The ROM 253 and the storage device 254 store programs (including a program for implementing the software configuration illustrated in FIG. 3B described below). The RAM 252 functions as a memory or a work area for the CPU 251. The CPU 251 performs processing of executing programs with the RAM 252, the ROM 253, and the storage device 254, and processing of recording data in a recording medium such as the storage device 204. The storage device 254 is a storage device such as a hard disk drive (HDD) or a solid-state drive (SSD). The storage device 254 functions as an external storage device, stores management information about the image forming apparatus 102, and can also store system information and processing information, instead of the RAM 252. The input/output I/F 257 includes, for example, a PS2 or Universal Serial Bus (USB I/F), and an analog or digital display I/F. The input/output device 258 is a keyboard, a mouse, a CRT, or a liquid crystal display, and is connectable to the management server 106 via the input/output I/F 257. The management server 106 performs communication via the LAN 101, the Internet environment 107, and the Internet 108 using the network I/F 255, thereby making it possible to communicate with the image forming apparatus 102, the PC 105, and the PC 110. Note that the hardware configuration of the firmware management server 109 is similar to that of the management server 106 described above. The hardware configuration of each of the PC 105, the vendor user PC 110, and the delivery system 111 is also similar to that of the management server 106 described above.

The CPU 251 executes processing based on the program stored in the ROM 253 or the storage device 254, thereby implementing the software configuration of the management server 106 illustrated in FIG. 3B, the processing of the management server 106 illustrated in FIG. 5, and the processing of the flowchart illustrated in FIG. 10 as described below.

Figure 3A:
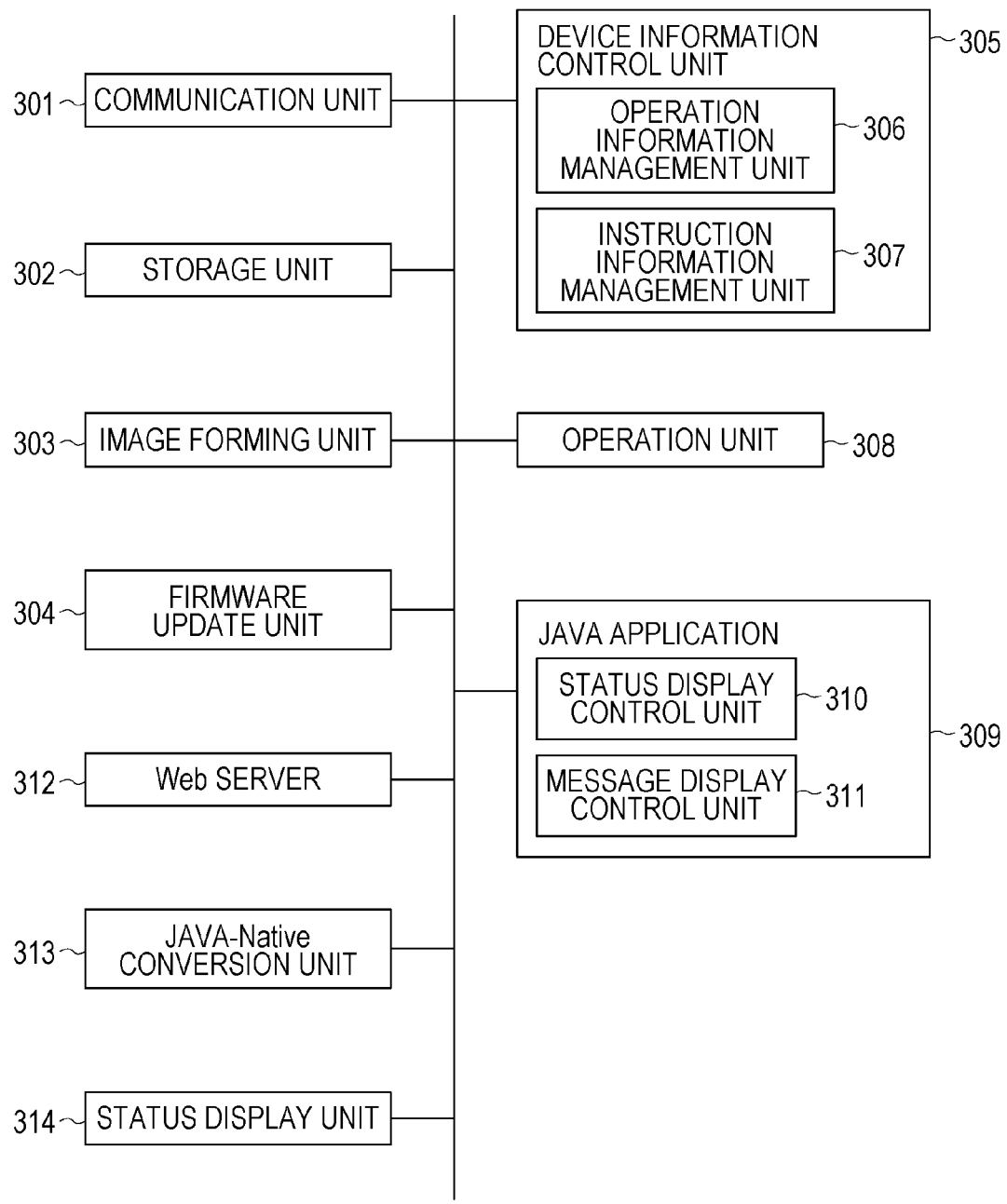
FIG. 3A is an example of a software configuration diagram illustrating the image forming apparatus according to one or more aspects of the present disclosure.

FIG. 3A is a diagram illustrating an example of the software configuration of the image forming apparatus 102.

The image forming apparatus 102 includes, as the software configuration, a communication unit 301, a storage unit 302, an image forming unit 303, a firmware update unit 304, a device information control unit 305, an operation unit 308, and a JAVA® application 309. The communication unit 301 transmits device information about the image forming apparatus 102 to the management server 106. Further, the communication unit 301 receives the instruction and information transmitted from the management server 106. The transmission and reception is performed by communication using SMTP, HTTP/HTTPS, or the like. The storage unit 302 exchanges information with the storage area of each of the RAM 202, the ROM 203, and the storage device 204. The storage unit 302 stores, in the storage area, the operation history of the image forming apparatus 102, data representing various abnormal states, and the like as device information. Note that the device information includes image forming apparatus identification information such as a device ID, and communication information such as an IP address. Further, the device information includes counter information, abnormal state occurrence information, and various pieces of device information. The storage unit 302 also stores, in the storage area, communication information, such as the IP address of the management server 106 that manages the image forming apparatus 102 as management server information. The image forming unit 303 has a function of generating and outputting print data. The firmware update unit 304 performs update management of the firmware information about the image forming apparatus 102. More specifically, the firmware update unit 304 accepts a firmware update instruction from the management server 106 via the device information control unit 305, and updates the firmware. During updating of the firmware, the firmware update unit 304 makes an inquiry to the firmware management server 109, acquires firmware from the firmware management server 109, and updates the firmware. Note that the firmware update unit 304 transmits the execution result to the management server 106 via the firmware management server 109 or the device information control unit 305. The device information control unit 305 manages the print control or abnormal state of the image forming apparatus 102, and also manages the counter information and notification information. Further, the device information control unit 305 performs control for a color adjustment, a print mode, and setting of other functions. The device information control unit 305 includes an operation information management unit 306 and an instruction information management unit 307. The operation information management unit 306 generates failure information to be transmitted to the management server 106 when a failure occurs in the image forming apparatus 102. Note that the operation information management unit 306 manages not only the failure information, but also information (consumable information) about consumables such as a toner or a component. The operation information such as the failure information, the consumable information, and the counter information about the image forming apparatus 102 is transmitted to the management server 106 via the network I/F 205. The type, transmission timing, and the like of the information to be transmitted are set according to an instruction from the management server 106. The instruction information management unit 307 carries out the instruction from the management server 106, and notifies the management server 106 of the result. In other words, the instruction information management unit 307 functions as an acquisition unit that acquires an instruction from the management server 106. In addition, the instruction information management unit 307 functions as a transmission unit that transmits information to the management server. Depending on the content of the instruction, the instruction information management unit 307 sends an instruction to each unit, and notifies the management server 106 of the execution result in each unit.

The operation unit 308 is an interface capable of sending an operation instruction to the image forming apparatus 102, including a print instruction from the user. The JAVA application 309 includes a status display control unit 310 and a message display control unit 311. The status display control unit 310 determines whether or not to display a status bar. The message display control unit 311 starts a Web browser function (a Web browser etc.) according to a user operation, and controls the display of a message or the like from the management server 106. A Web server 312 operates as an HTTP server, and, for example, registers or executes a CGI function. A JAVA-Native conversion unit 313 is an API for performing transmission and reception of information between a JAVA application and a Native application. A status display unit 314 controls the display of a notification indicating state information about the image forming apparatus 102 in a status display area, such as the status bar, of the input/output device 210. Further, the status display unit 314 also controls, for the status bar or the like, the display of a notification indicating an incoming call of a message, upon acquisition of instruction information or the like from the management server 106. The status display area, such as the status bar, of the input/output device 210, is an example of a predetermined display area of the display unit.

Figure 3B:
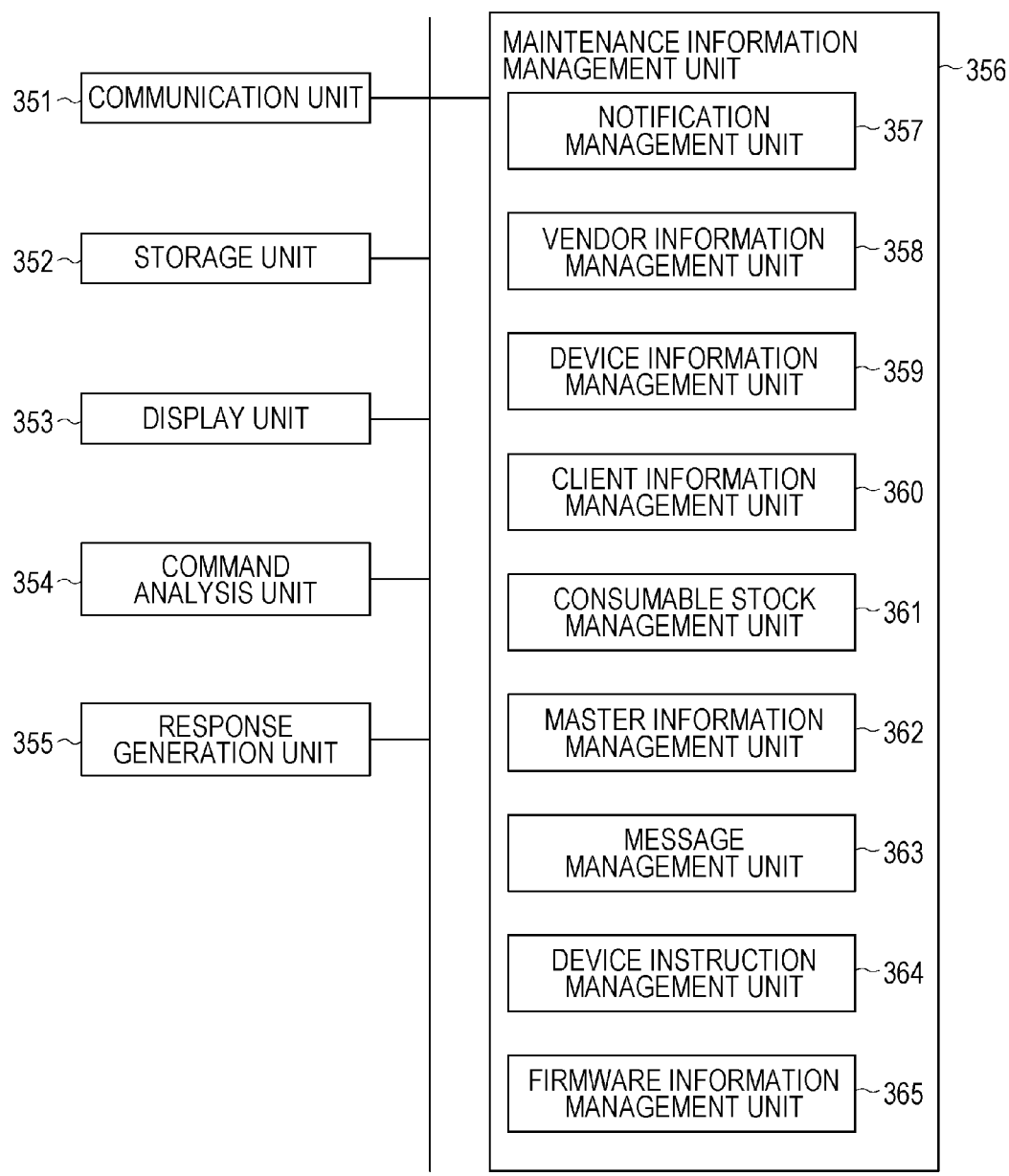
FIG. 3B is an example of a software configuration diagram illustrating the management server according to one or more aspects of the present disclosure.

FIG. 3B is a diagram illustrating an example of a software configuration of the management server 106.

The management server 106 includes, as the software configuration, a communication unit 351, a storage unit 352, a display unit 353, a command analysis unit 354, a response generation unit 355, and a maintenance information management unit 356. The communication unit 351 has a function of performing communication with the image forming apparatus 102. The communication unit 351 receives device information transmitted from the image forming apparatus 102, and transmits necessary instruction/information to the image forming apparatus 102. The counter value indicates the total number of sheets printed by the image forming apparatus 102. The storage unit 352 exchanges information with the storage area of each of the RAM 252, the ROM 253, and the storage device 254, and stores device information, vendor information, client information, and the like in the storage area. The display unit 353 performs processing for displaying the device information stored in the storage unit 352 as a Web screen. A WWW server operates within the management server 106, and the Web screen is provided to a Web browser in response to a request from the Web browser. With this configuration, a service person or the like of a vendor can browse information using the Web browser on the vendor user PC 110. A Web site for, for example, browsing the Web screen is hereinafter referred to as a portal site. The command analysis unit 354 analyzes a command transmitted from the image forming apparatus 102. The command analysis unit 354 reflects the analyzed result in the storage unit 352, the maintenance information management unit 356, and the display unit 353. The response generation unit 355 generates a response to the image forming apparatus 102 for the command analyzed by the command analysis unit 354. The maintenance information management unit 356 has a control function of managing information necessary for monitoring and maintaining the image forming apparatus 102. The maintenance information management unit 356 includes a notification management unit 357, a vendor information management unit 358, a device information management unit 359, a client information management unit 360, and a consumable stock management unit 361. The maintenance information management unit 356 also includes a master information management unit 362, a message management unit 363, a device instruction management unit 364, and a firmware information management unit 365. The notification management unit 357 generates notification information and designates a notification destination, thereby generating notification data. Examples of the notification by the notification management unit 357 include a maintenance request notification to the service person who maintains the image forming apparatus 102, and a consumable replenishment request notification. The vendor information management unit 358 manages information about the vendor that manages and supports the image forming apparatus 102 installed on the client. The device information management unit 359 manages the image forming apparatus 102 to be maintained. For example, the device information management unit 359 manages information such as image forming apparatus identification information, abnormal state information about the image forming apparatus, maintenance history, administrator information about the image forming apparatus, and consumable information about the image forming apparatus. Note that the abnormal state information includes operation information such as an error, alarm, and jam, is displayed on the portal site, and is browsed by a dispatcher of a vendor, a service person, or the like. The operation information is used to manage the status such as "unsupported", "being resolved", or "already resolved" depending on the handling status of the vendor. The client information management unit 360 manages information about the client where the image forming apparatus 102 is installed. The information managed by the client information management unit 360 includes information about a maintenance contract with the vendor. The consumable stock management unit 361 performs consumable stock management for the image forming apparatus 102, such as toner/ink and components. More specifically, the consumable stock management unit 361 performs stock subtraction processing based on information indicating the toner/ink remaining amount transmitted from the image forming apparatus 102, and information indicating component replacement, and coordinates with the notification management unit 357 when the processing result exceeds a set threshold, thereby performing a notification such as a consumable replenishment request notification. The master information management unit 362 manages master information necessary for display of, for example, apparatus model information, operation information, and component information. Examples of the master information include the product name of a certain apparatus model, information about a consumable to be used, an explanation of a content of operation information transmitted from the image forming apparatus 102, and a lifetime value of each component. The message management unit 363 generates and manages a message to be displayed on the display unit of the image forming apparatus 102. The message indicates an HTML to be displayed on the message display control unit 311 of the image forming apparatus 102. The content displayed by the message indicates the general maintenance of the image forming apparatus 102, such as a delivery status of a consumable, a dispatch status of a service person, and an announcement of execution of system maintenance or firmware update. The device instruction management unit 364 manages instructions to the image forming apparatus 102. The content of instructions managed by the device instruction management unit 364 includes a change of a schedule for information transmission to the management server 106, firmware update, and reboot. The instructions to the image forming apparatus 102 are accepted on the portal site or the like by a vendor user, and are stored in the storage unit 352 as instructions to the target image forming apparatus 102. Further, the device instruction management unit 364 manages the execution result of the image forming apparatus 102 in response to the instructions as a status, such as "success", "failure", or "unknown". The firmware information management unit 365 displays the received firmware version information about the image forming apparatus 102 on the portal site, and performs settings for firmware delivery in cooperation with the firmware management server 109. When the firmware management server 109 performs settings for firmware deliver, the firmware information management unit 365 registers a firmware update instruction for the device instruction management unit 364.

Figure 4:
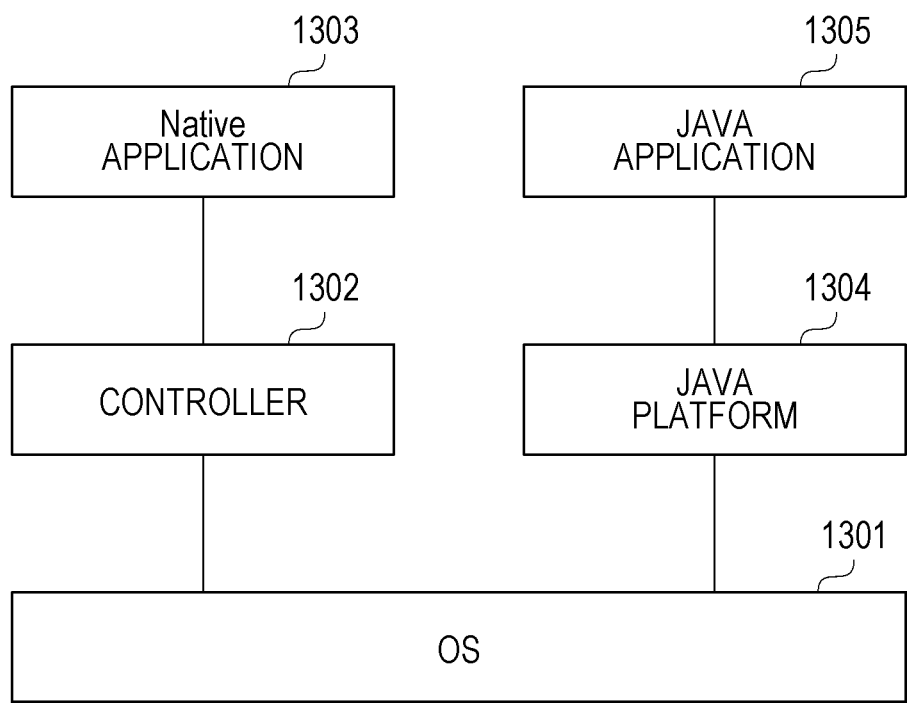
FIG. 4 is an example of a diagram illustrating an architecture of the image forming apparatus according to one or more aspects of the present disclosure.

FIG. 4 is a diagram illustrating an example of an architecture of the image forming apparatus 102.

Software for the image forming apparatus 102 operates on an OS 1301. A controller 1302 and a JAVA platform 1304 operate on the OS 1301. The JAVA platform 1304 functions as a virtual machine that operates on the OS 1301. A Native application 1303 operates on the controller 1302. A JAVA application 1305 operates on the JAVA platform 1304. Since the Native application 1303 and the JAVA application 1305 operate using different resources, it is necessary to transmit and receive information through loopback communication or the JAVA-Native conversion unit 313.

FIG. 5 is a sequence diagram illustrating an example of information processing from registration of a message in the management server 106 to display of the message by the message display control unit 311 of the image forming apparatus 102.

The management server 106 accepts the registration of the message from the vendor user PC 110 on the portal site. When the registration of the message from the vendor user PC 110 is accepted, in step S401, the management server 106 generates a message, and registers a message acquisition instruction in the target image forming apparatus 102. In step S402, the image forming apparatus 102 confirms whether or not there are periodic instructions, by sending an SOAP message as illustrated in FIG. 6A to the management server 106.

FIG. 6A is a diagram illustrating an example of the SOAP message transmitted in step S402 illustrated in FIG. 5.

An SOAP message 501 is an SOAP message transmitted by the device information control unit 305. A getInstruction tag indicates an instruction check. A client tag or a device tag indicates device information.

In step S402, when the presence or absence of an instruction from the image forming apparatus 102 is checked, in step S403, the management server 106 confirms an instruction management history table of the corresponding image forming apparatus 102.

As a result of the confirmation, when there is a "message acquisition" instruction with an instruction status of "unprocessed", in step S404, the management server 106 includes the "message acquisition" instruction in the SOAP message illustrated in FIG. 6B in response to the confirmation from the image forming apparatus 102. On the other hand, as a result of the confirmation, when the "message acquisition" instruction indicating that the instruction status indicates "unprocessed" is not present, in step S404, the management server 106 returns a response indicating that the confirmation as to whether or not there is an instruction from the image forming apparatus 102 is normally received.

FIG. 6B is a diagram illustrating an example of the SOAP message returned in step S404 illustrated in FIG. 5.

An SOAP message 502 is an SOAP message transmitted by the management server 106. A getInstructionResponse tag indicates an instruction check response. A notice tag indicates that there is a "message acquisition" instruction. A key tag indicates that a value tag is latest message registration time information. The value tag indicates the latest message registration time information.

Note that the SOAP message returned in step S404 is not limited to "message acquisition". For example, FIG. 6C illustrates the SOAP message indicated by the "firmware update" instruction. An SOAP message 503 is an SOAP message transmitted by the management server 106. The getInstructionResponse tag indicates an instruction check response. A download tag indicates that the "firmware update" instruction is present. A URL tag indicates the URL of the firmware management server. A userID tag and a password tag indicate a user name and password which are used for authentication.

In step S404, when the "message acquisition" instruction is received from the management server 106, the device information control unit 305 of the image forming apparatus 102 stores the latest message registration time information. The device information control unit 305 registers, in the Web server 312, the CGI function for returning the latest message registration time information in advance. In step S405, the status display control unit 310 acquires the latest message registration time information by periodic polling. The status display control unit 310, which is a JAVA application, accesses the CGI function registered by the device information control unit 305 by loopback communication, and acquires the latest message registration time information from the device information control unit 305. The status display control unit 310 compares the acquired latest message registration time information with time information indicating a time when a message list is displayed by the message display control unit 311. When the latest message registration time information is newer than the time information, the processing proceeds to step S406. In step S406, the status display control unit 310 sends an instruction to display the status to the status display unit 314 through the JAVA-Native conversion unit 313. Further, in the status display unit 314, the input/output device 210 displays that a message has arrived on the status bar (see FIG. 7). Only one word can be displayed on the status bar. Accordingly, if a request for displaying words with a priority equal to or higher than the same value is made, there is a possibility that the words saying that the message has arrived may be immediately deleted. Accordingly, the status display control unit 310 continuously makes a display request for one minute at intervals of five seconds, so that the words saying that the message has arrived can be continuously displayed on the input/output device 210 for at least one minute.

FIG. 7 is a diagram illustrating an example of the status bar display on the screen displayed on the input/output device 210 of the image forming apparatus 102.

A status bar 600 is capable of displaying information indicating that a message has arrived, as indicate by information 601. An icon 602 is an icon indicating that a message has arrived. An "announcement function" icon 603 is an icon for using the "announcement function". In step S407, the message display control unit 311 starts the browser function when the user selects the "announcement function" icon 603 through the input/output device 210. The term "icon" described herein refers to an image representing a content of a function, which is provided by selection, using a character, a diagram, or a picture. The "announcement function" icon 603 is an example of an object for confirming the message displayed on the display unit. Note that the input/output device 210 is an example of the display unit. The information 601 is an example of a character string indicating that a message has arrived. The icon 602 is an example of the object indicating that the message has arrived.

Figure 8A:
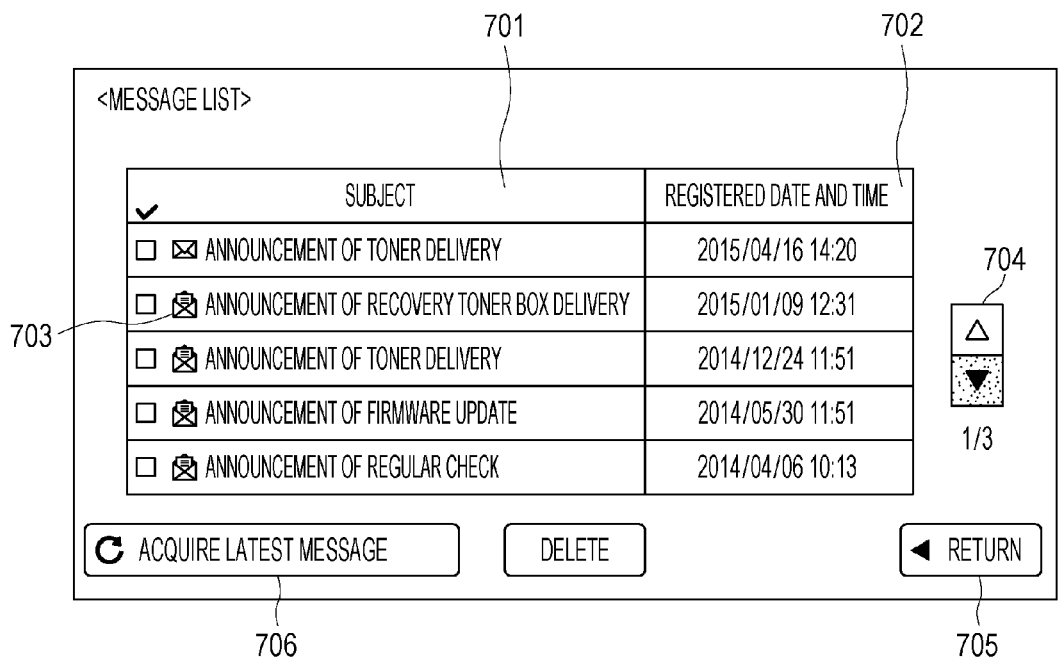
FIGS. 8A and 8B are diagrams each illustrating an example of a massage list and a message screen according to one or more aspects of the present disclosure.

Next, in step S408, the message display control unit 311 requests the management server 106 to send data (HTML etc.) including the message. In this case, authentication processing is performed between the image forming apparatus 102 and the management server 106. In step S409, the management server 106 returns data including the target message to the message display control unit 311 in response to the request in step S408. The message display control unit 311 receives the data. In step S410, the message display control unit 311 uses the browser function based on the data received in step S409, and controls the display of the message on the input/output device 210. As a result, for example, a message list as illustrated in FIG. 8A is displayed. The massage list is an example of a list of messages.

FIG. 8A is a diagram illustrating an example of the message list displayed in step S410 illustrated in FIG. 5. Each message is displayed in a list, and a subject 701 indicates a subject of a message. Registered date and time 702 indicates the date and time when the message is registered in the management server 106. A status 703 indicates the status of a message, and represents "unread" or "read". A button 704 indicates a button for page transition that is started when the number of messages exceeds an upper limit of display on the screen. A button 705 indicates a button to be pressed in the case of returning from the screen for the massage list. A button 706 indicates a button for acquiring the latest massage list screen. After the message list is displayed in step S410, in step S411, the message display control unit 311 stores the time information about a time when the massage list is displayed. Note that the stored time information may be time information about a time when the message list is successfully acquired from the management server 106. When a certain message is selected by the user on the screen for the message list displayed in step S410, in step S412, the message display control unit 311 displays the selected message detail screen as illustrated in, for example, FIG. 8B.

Figure 8B:
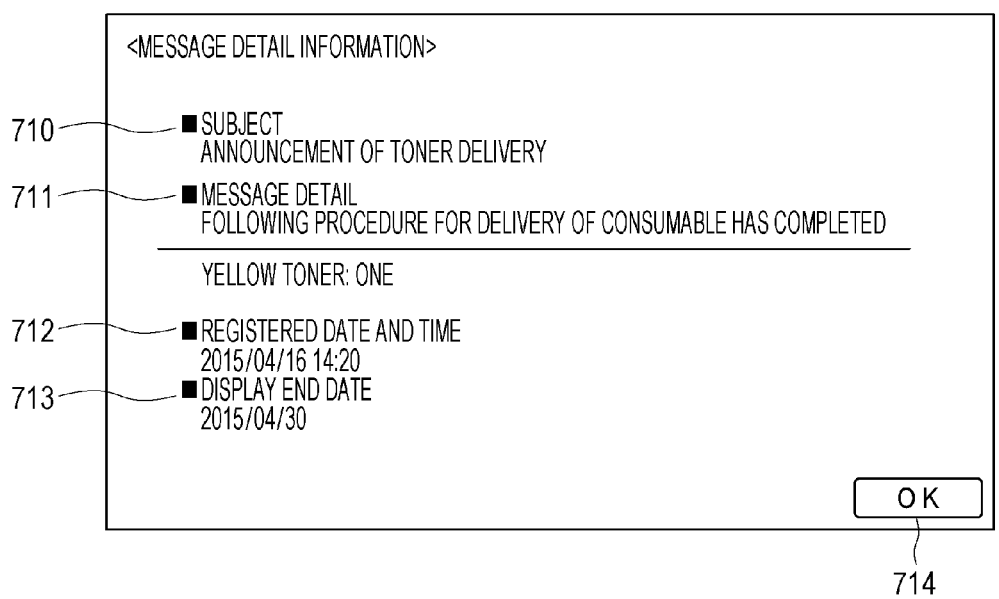

FIG. 8B is a diagram illustrating an example of a message detail screen displayed when a certain message is selected from the massage list.

A subject 710 indicates a subject of a message. A message detail 711 indicates the content of the message, and corresponds to the content of the message input on the registration screen of the management server 106. Registered date and time 712 indicates the date and time when the message is registered in the management server 106. Display end date 713 indicates the message display end date, which corresponds to the display end date of the message input on the registration screen of the management server 106. When the user selects an OK button 714, the screen returns from the detail screen illustrated in FIG. 8B to the message list screen illustrated in FIG. 8A, and the status 703 of the message shifts to the "read" state.

As described above, the message display control unit 311 displays messages on the input/output device 210 by using the browser function, thereby making it possible to display various messages associated with the maintenance management work of the image forming apparatus. Note that messages can be updated on the registration screen of the management server 106. Messages can be deleted by both the management server 106 and the image forming apparatus 102. The user can select a check box for a message to be deleted, as illustrated in a check box 801 in FIG. 9, on the massage list screen, and can delete the message by selecting a delete button 802.

FIG. 9 is a diagram illustrating an example of a screen when a message is deleted on the massage list screen. In addition, messages can be deleted by other methods such as a method of deleting message in chronological order when the number of messages reaches an upper limit, and a method of automatically deleting messages when the display end date is reached.

Note that instead of using the time information, sequence numbers may be given to messages, respectively, and the sequence numbers may be transmitted and received by communication, to thereby determine whether or not to display the status bar. In this case, the device information control unit 305 acquires the sequence number of the registered latest message from the management server 106. The message display control unit 311 stores the sequence number of the latest message displayed on the massage list. In this case, the message display control unit 311 compares the sequence number of the registered latest message with the sequence number of the latest message displayed on the massage list, and when the sequence number of the registered latest message is larger, the status bar is displayed.

Figure 10:
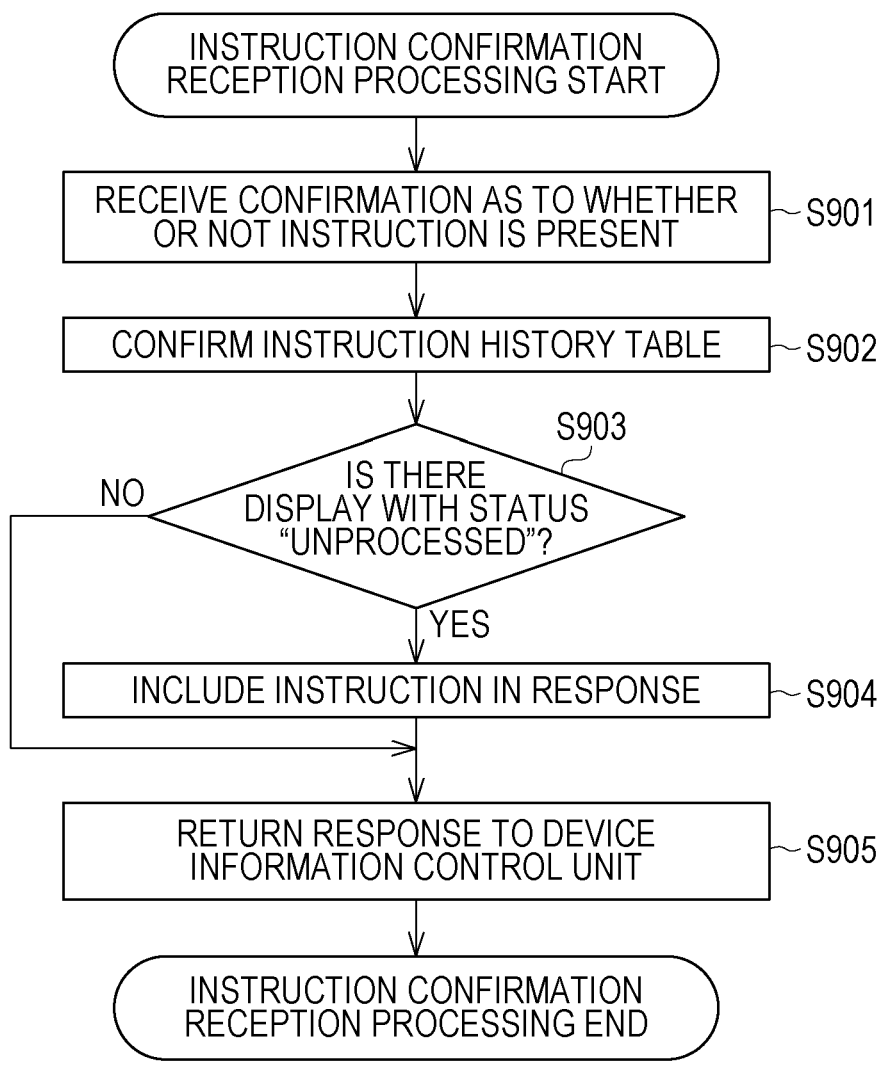
FIG. 10 is an example of a flowchart of instruction confirmation reception processing performed by the management server according to one or more aspects of the present disclosure.

FIG. 10 is a flowchart illustrating an example of instruction confirmation reception processing of the management server 106. In step S901, when the management server 106 receives the confirmation as to whether or not there is an instruction from the device information control unit 305, the processing proceeds to step S902.

In step S902, the management server 106 confirms the instruction management history table corresponding to the image forming apparatus 102 of the device information control unit 305 which has received the confirmation as to the presence or absence of an instruction in step S901. Next, in step S903, the management server 106 determines whether or not the instruction with the instruction status of "unprocessed" is present in the corresponding instruction management history table. When the management server 106 determines that the instruction with the instruction status of "unprocessed" is present (YES in step S903), the processing proceeds to S904.

In step S904, the management server 106 includes the instruction with the instruction status of "unprocessed" in the response to the device information control unit 305, and the processing proceeds to step S905.

On the other hand, when the management server 106 determines that the instruction with the instruction status of "unprocessed" is not present (NO in step S903), the instruction is not included in the response to the device information control unit 305, and the processing directly proceeds to step S905.

In step S905, the management server 106 returns a response to the device information control unit 305. In this case, a plurality of instructions with the status of "unprocessed" may be present. In that case, first, the management server 106 manages the transmission sequence of the plurality of instructions. Further, an instruction to be transmitted first and having the status of "unprocessed", and a command for causing the device information control unit 305 to confirm, again, whether or not an instruction is present are included in the response in step S905. Thus, the processing is repeated in the order of instructions until all instructions are sent to the device information control unit 305 from the management server 106. Note that in the case where a plurality of instructions with the status of "unprocessed" is present, the management server 106 may include all the instructions in one response. Then, the management server 106 terminates the processing of the flowchart.

Next, control executed by the image forming apparatus 102 will be described with reference to flowcharts of FIGS. 11 to 13.

Figure 11:
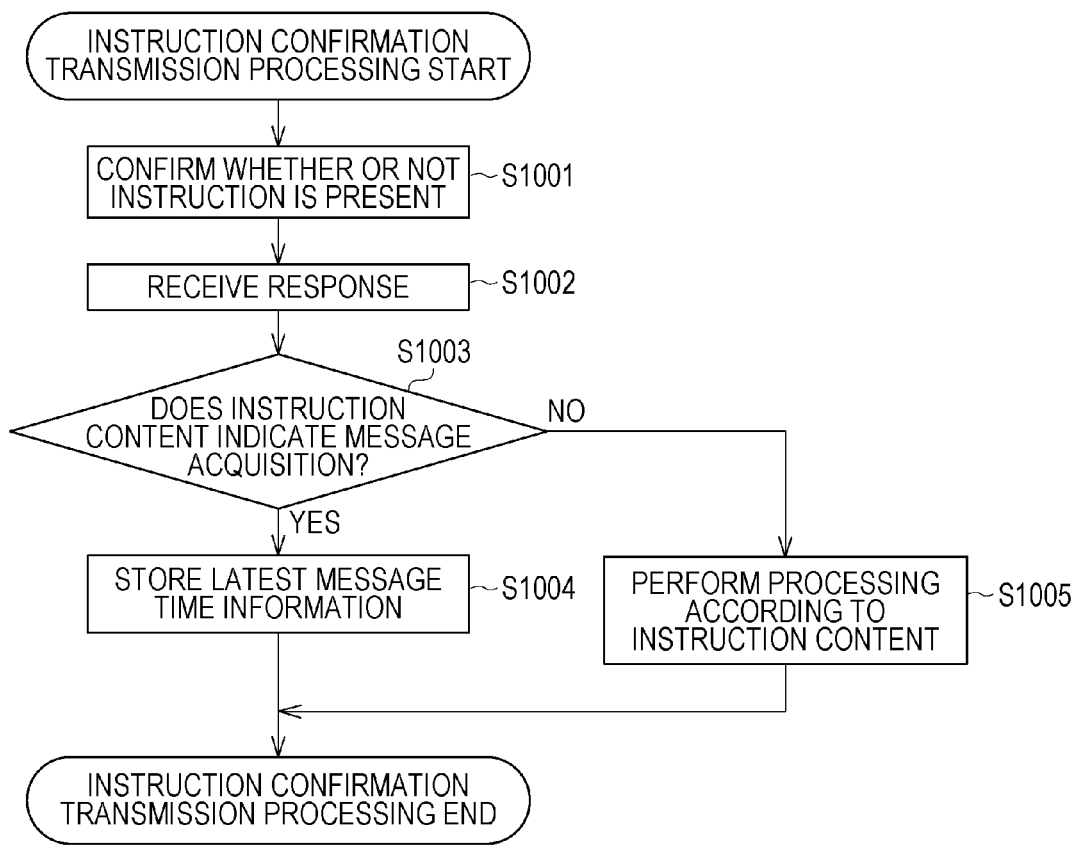
FIG. 11 is an example of a flowchart of instruction confirmation transmission processing performed by a device information control unit according to one or more aspects of the present disclosure.

FIG. 11 is a flowchart illustrating an example of instruction confirmation transmission processing performed by the device information control unit 305.

In step S1001, the device information control unit 305 confirms the presence or absence of an instruction sending the SOAP message as illustrated in FIG. 6A to the management server 106. Inquiry transmission for confirmation from the device information control unit 305 to the management server 106 is carried out periodically, such as every several hours.

In step S1002, when the device information control unit 305 receives a response using the SOAP message as illustrated in FIG. 6B, the processing proceeds to step S1003.

In step S1003, the device information control unit 305 determines whether or not the instruction content included in the response is message acquisition. Further, when the device information control unit 305 determines that the instruction content is message acquisition (YES in step S1003), the processing proceeds to S1004.

In step S1004, the instruction information management unit 307 within the device information control unit 305 stores the latest message registration time information. Then, the instruction information management unit 307 terminates the processing of the flowchart.

On the other hand, when the device information control unit 305 determines that the instruction content is not message acquisition (NO in step S1003), the processing proceeds to S1005.

In step S1005, the device information control unit 305 carries out processing according to the instruction content. More specifically, the processing includes processing (change of a setting for the monitoring function) that reflects the instruction content including the designation of the type of the operation information about the image forming apparatus 102 to be monitored by the device information control unit 305, and designation of a transmission timing and the like. In addition, processing of controlling the power supply of the image forming apparatus 102 according to the instruction content (turning ON again after power OFF) is also included. After the processing of S1005 is finished, the device information control unit 305 terminates the processing of the flowchart.

Figure 12:
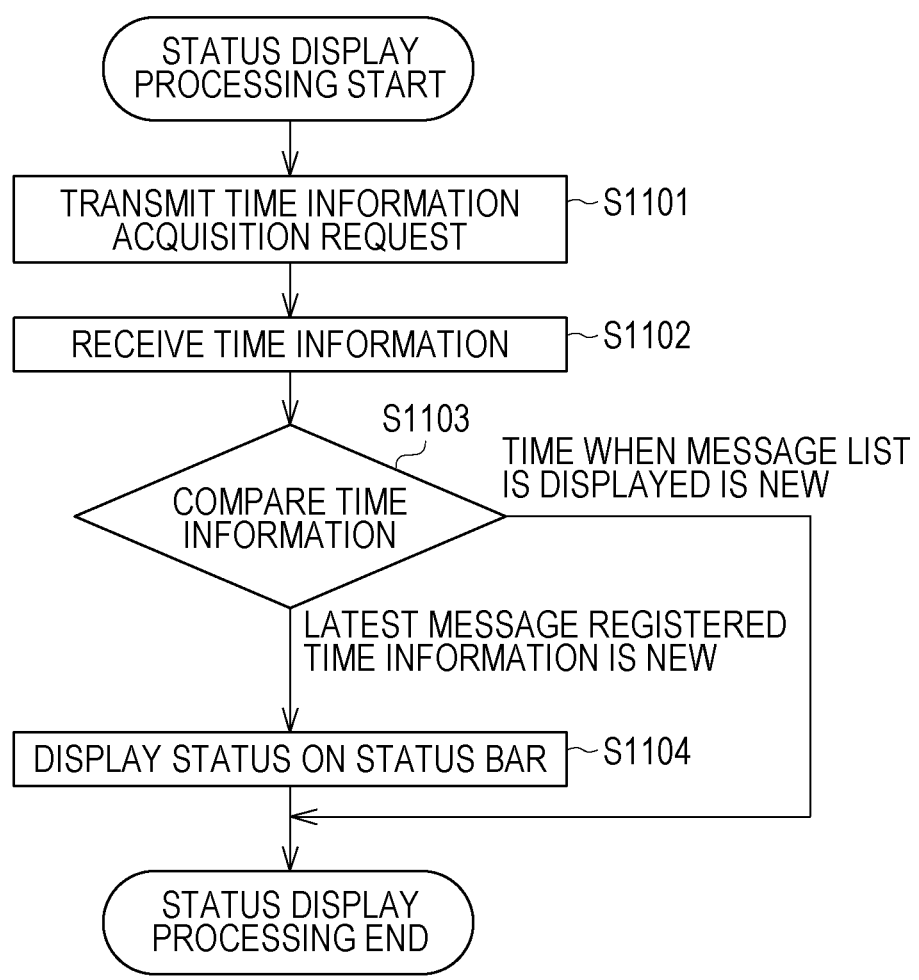
FIG. 12 is an example of a flowchart of status display processing performed by a status display control unit according to one or more aspects of the present disclosure.

FIG. 12 is a flowchart illustrating an example of status display processing for the status display control unit 310.

In step S1101, the status display control unit 310 transmits a request for acquiring the latest message registration time information to the device information control unit 305. The status display control unit 310, which is a JAVA application, accesses the CGI function, which is registered by the device information control unit 305, by loopback communication, and acquires the latest message registration time information from the device information control unit 305.

In step S1102, the status display control unit 310 receives the latest message registration time information from the device information control unit 305.

In step S1103, the status display control unit 310 compares the acquired latest message registration time information with the time information about a time when the message list is displayed by the message display control unit 311 to know which is newer. When the latest message registration time information is newer, the status display control unit 310 proceeds the processing to S1104. On the other hand, when the time information about a time when the message list is displayed is newer, the status display control unit 310 terminates the processing of the flowchart.

In step S1104, the status display control unit 310 sends an instruction to display the status to the status display unit 314 through the JAVA-Native conversion unit 313. Since only one word can be displayed in the status bar, when a request for displaying words with a priority equal to or higher than the same height is made, the words saying that the message has arrived may be immediately deleted. Accordingly, a display request is continuously made by the status display control unit 310 for one minute at intervals of five seconds, so that the words saying that the message has arrived can be continuously displayed for at least one minute. Then, the status display control unit 310 terminates the processing of the flowchart.

Figure 13:
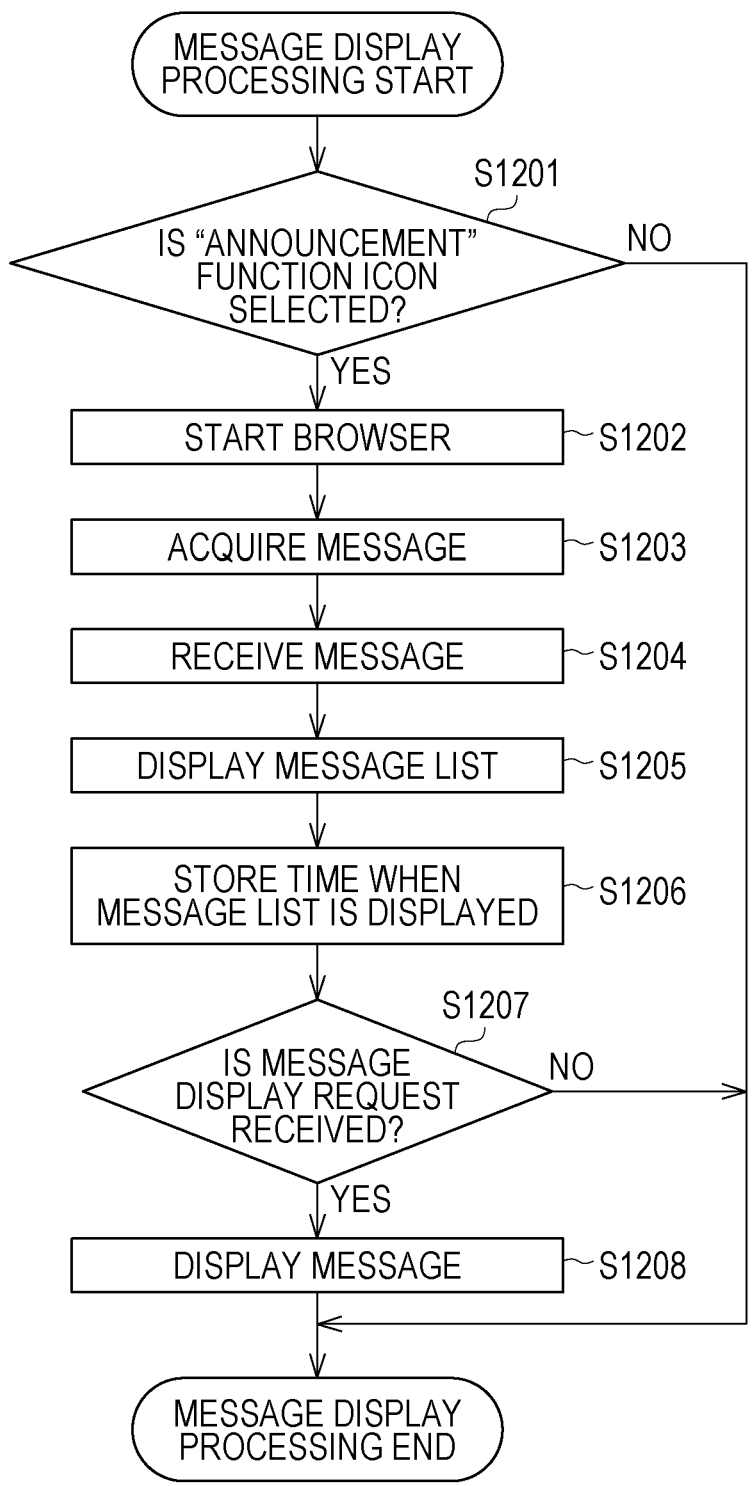
FIG. 13 is an example of a flowchart of message display processing performed by a message display control unit according to one or more aspects of the present disclosure.

FIG. 13 is a flowchart illustrating an example of message display processing performed by the message display control unit 311.

In step S1201, the message display control unit 311 determines whether or not an "announcement" function icon is selected by the user. When the icon is selected (YES in step S1201), the message display control unit 311 proceeds the processing to step S1202. When the icon is not selected (NO in step S1201), the message display control unit 311 terminates the processing of the flowchart. In step S1202, the message display control unit 311 starts the browser.

In step S1203, the message display control unit 311 acquires a message for the management server 106.

In step S1204, the message display control unit 311 receives a message from the management server 106.

In step S1205, the message display control unit 311 displays the message list as illustrated in FIG. 8A.

In step S1206, the message display control unit 311 stores a time when the massage list is displayed. Note that time information to be stored may be time information about a time when the message list is successfully acquired from the management server 106.

In step S1207, the message display control unit 311 determines whether or not a message display request is received from the user. When the request is received (YES in step S1207), the message display control unit 311 proceeds the processing to step S1208. When the request is not received (NO in step S1207), the message display control unit 311 terminates the processing of the flowchart.

In step S1208, the message display control unit 311 displays the message as illustrated in FIG. 8B on the input/output device 210.

As described above, in this exemplary embodiment, as a method of confirming whether or not there is a message, the image forming apparatus 102 acquires the latest message registration time from the management server 106. Further, the image forming apparatus 102 compares the held message browsing time and the acquired latest message registration time. When the latest message registration time is newer than the message browsing time, it is determined that there is a new message.

Accordingly, the image forming apparatus 102 can display the notification content on the status bar only when the user does not confirm the notification content. The image forming apparatus 102 can delete the notification of the status bar based on browsing of the message by the user, and thus can send a notification of a message with high convenience for the user.

Further, in this exemplary embodiment, it is possible to notify the user that a new message has arrived, without increasing the traffic required for communication during polling, unlike in a case where the text of a registered message is acquired during polling periodically performed via a network. In practice, the image forming apparatus 102 acquires the text of a message from the management server 106 when the user selects the "announcement function" icon. Accordingly, a time zone in which communication occurs by polling and a time zone in which communication occurs when the text of a message is acquired can be distributed, and the notification to the user can be performed appropriately while distributing the network traffic. According to the processing of the exemplary embodiments described above, it is possible to provide a mechanism for displaying the presence or absence of a notification from a server device on a status bar, only when the user does not confirm the content of the notification.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-204379, filed Oct. 18, 2016, which is hereby incorporated by reference herein in its entirety.

What is claimed is:

1. An image forming apparatus that communicates with a management server, the image forming apparatus comprising:
   an operation unit;
   a memory storing first instructions related to software for communicating with the management server and second instructions related to an application for display control, and
   at least one hardware processor executing the second instructions causing the image forming apparatus to:
   acquire message list information from the management server;
   control to display a message list on the operation unit based on the acquired message list information, and
   store first time information indicating a time when the message list has been displayed on the image forming apparatus, and
   wherein the at least one hardware processor executes the first instructions causing the image forming apparatus to:
   periodically make an inquiry about an instruction to the management server; and
   store second time information about a registered time of the message acquired from the management server as a result of the inquiry, and
   acquire the second time information stored by the software;
   determine whether or not to display a notification indicating that a message has arrived, based on the acquired second time information and the first time information; and
   control the notification indicating that a message has arrived to be displayed in a predetermined display area on the operation unit in accordance with a determination that the notification is displayed in a case where the registered time indicated by the acquired second time information is newer than the time indicated by the first time information, and
   wherein the notification indicating that the message has arrived is not displayed in the predetermined display area on the operation unit in a case where the registered time indicated by the acquired second time information is not newer than the time indicated by the first time information.

2. The image forming apparatus according to claim 1, wherein the acquired message list information is content data described in an HTML format for a Web browser in the image forming apparatus.

3. The image forming apparatus according to claim 1, wherein the second time information stored by the software is acquired using an inquiry by internal loopback to a Web server operating on the image forming apparatus.

4. The image forming apparatus according to claim 3, wherein
   a polling interval at which the software periodically makes an inquiry about an instruction to the management server is longer than a polling interval at which the application periodically makes an inquiry by internal lookback to the Web server operating on the image forming apparatus.

5. The image forming apparatus according to claim 1, wherein
   the predetermined display area on the operation unit is a status bar.

6. A method of controlling an image forming apparatus including an operation unit and configured to perform communication with a management server, the method comprising:
   acquiring message list information from the management server;
   controlling to display a message list on the operation unit based on the acquired message list information;
   storing first time information indicating a time when the message list has been displayed on the image forming apparatus;
   periodically making an inquiry about an instruction to the management server;
   storing second time information about a registered time of the message acquired from the management server as a result of the inquiry;
   acquire the second time information stored by the software;
   determining whether or not to display a notification indicating that a message has arrived, based on the acquired second time information and the first time information; and controlling the notification indicating that a message has arrived to be displayed in a predetermined display area on the operation unit in accordance with a determination that the notification is displayed in a case where the registered time indicated by the acquired second time information is newer than the time indicated by the first time information, and wherein the notification indicating that the message has arrived is not displayed in the predetermined display area on the operation unit in a case where the registered time indicated by the acquired second time information is not newer than the time indicated by the first time information.

7. A non-transitory computer-readable storage medium storing a program for causing a computer to execute a method of controlling an image forming apparatus including an operation unit and capable of communicating with a management server, the method comprising:

acquiring message list information from the management server;

controlling to display a message list on the operation unit based on the acquired message list information;

storing first time information indicating a time when the message list has been displayed on the image forming apparatus;

periodically making an inquiry about an instruction to the management server;

storing second time information about a registered time of the message acquired from the management server as a result of the inquiry;

acquire the second time information stored by the software;

determining whether or not to display a notification indicating that a message has arrived, based on the acquired second time information and the first time information; and controlling the notification indicating that a message has arrived to be displayed in a predetermined display area on the operation unit in accordance with a determination that the notification is displayed in a case where the registered time indicated by the acquired second time information is newer than the time indicated by the first time information, and wherein the notification indicating that the message has arrived is not displayed in the predetermined display area on the operation unit in a case where the registered time indicated by the acquired second time information is not newer than the time indicated by the first time information.

\* \* \* \* \*